United States Patent [19]

Uchiyama et al.

[11] 3,924,450

[45] Dec. 9, 1975

[54] DEVICE FOR MEASURING THREE DIMENSIONAL COORDINATES OF MODELS

[75] Inventors: Tomoyoshi Uchiyama; Susumu Sekino; Kenji Tani, all of Osaka, Japan

[73] Assignee: Hitachi Shipbuilding & Engineering Co., Ltd., Osaka, Japan

[22] Filed: May 10, 1974

[21] Appl. No.: 468,867

[30] Foreign Application Priority Data

| May 10, 1973 | Japan | 48-52787 |
| May 10, 1973 | Japan | 48-52788 |
| May 10, 1973 | Japan | 48-55774 |
| June 12, 1973 | Japan | 48-70266 |

[52] U.S. Cl. .................. 73/67; 33/1 M; 33/125 W; 340/16 R
[51] Int. Cl.² .......................................... G01S 3/80
[58] Field of Search ........... 73/67, 67.5 R, 552, 555, 73/560, 71.5 US; 33/125 W, 1 M; 340/6 R, 16 R, 5 R; 343/112 R

[56] References Cited

UNITED STATES PATENTS

| 2,400,552 | 5/1946 | Hoover | 340/16 R |
| 2,424,773 | 7/1947 | Rieber | 340/16 R |
| 3,121,955 | 2/1964 | King | 73/67 X |

Primary Examiner—Richard C. Queisser
Assistant Examiner—Stephen A. Kreitman
Attorney, Agent, or Firm—Stewart and Kolasch, Ltd.

[57] ABSTRACT

A device for measuring three dimensional coordinates of models including a supersonic oscillator T placed at a point P on models to be measured, at least three supersonic receivers A, B and C provided at three known points in the coordinates and means for measuring, electrically, the time required for the supersonic waves to travel from the supersonic oscillating point t of said oscillator T to the supersonic receiving points $a$, $b$ and $c$ of the receivers, A, B and C, respectively. This period of time is converted to distance, and the three dimensional coordinates of the points to be measured are computed, based on the coordinates of the said known points and the converted distance.

8 Claims, 7 Drawing Figures

U.S. Patent  Dec. 9 1975  3,924,450

DEVICE FOR MEASURING THREE DIMENSIONAL COORDINATES OF MODELS

BACKGROUND OF THE INVENTION

The present invention relates to a device for measuring three dimensional coordinates of points to be measured in structural models such as marine engine room, land-base plants, and the like, by utilizing supersonic waves.

In the design and construction of marine engine rooms or landbase plants having various pipings and fittings, a so-called model engineering system has been developed recently wherein the arrangement of pipes, equipment and other elements is designed by making scale models of about one-tenth or one-twentieth the size. This is done instead of making designs based on a designers' imagination and expressed in drawings. The three dimensional measurements of model elements such as pipings, fittings, and the like, are required for the manufacture of actual engine rooms or plants based on the scale models.

In the case of manual measurements using scales, there has been some problems encountered, e.g., in the accuracy of measurement, high labor requirements and costs and difficulties of measurement in certain situations where the structure is complicated.

To solve these problems several devices for measuring three dimensional coordinates of the internal elements of models have been developed recently. One example of such a device is shown in FIG. 1, using three levers U, V and W freely slidable in parallel with the X-axis, the Y-axis and the Z-axis and crossing with each other. One lever U, i.e., the detecting end thereof is brought into contact with the point P to be measured, and then in such a position, the three dimensional coordinates (x, y, z) of the point P to be measured are read directly from the distances which the respective levers U, V and W were moved.

However, in such a device, since the respective levers U, V and W are to be moved by sliding said levers, the operaton is complicated and takes a long period of time. Furthermore, since the respective levers U, V and W are disposed in parallel with the respective x, y and z axis, and since their directions are constant, it is impossible to measure the three dimensional coordinates of an article having a complicated structure.

Another known device for measuring three dimensional coordinates is shown in FIG. 2. In this device, supersonic receivers U', V' and W' of the long bar type comprise the respective axis of the coordinates, X, Y and Z, and said receivers measure the shortest period of time it takes for the supersonic waves from the supersonic oscillator placed at the measuring point P to reach the respective axis. This period of time is converted to minimum distances between the point P and the respective axis for determining the three dimensional coordinates, x, y and z of the said point P.

However, in such device, there is required a special bar state microphone at the respective portions of the axis, and in the situation where the article to be measured is large, the bar state microphone becomes long with the result that the device becomes so large as not to be economically feasible. Furthermore, the technical properties of the microphone are reduced when it is so long. In addition, when there is any obstacle between the point P to be measured and the respective axis to receive the supersonic wave, it is impossible to measure the dimensional coordinates of the article.

SUMMARY OF THE INVENTION

It is, therefore, an object of the present invention to provide a device for determining three dimensional coordinates of points to be measured on models etc. by utilizing supersonic waves.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The embodiments of the device of the present invention will now be described with reference to FIGS. 3 to 7 as follows:

One embodiment of the device of the present invention will now be described with reference to FIG. 3. At least three receivers A, B and C composed of dotted microphones for receiving supersonic waves are optionally disposed in the space to be measured within the X—axis, the Y—axis and the Z—axis, and the coordinates of the receiving points a, b and c of the dotted microphones are determined as known coordinates ($x1$, $y1$, $1$), ($x2$, $y2$, $2$) and ($x3$, $y3$, $3$). Then, an oscillator T for producing a supersonic wave is placed at the point P to be measured, and the oscillating point t of the supersonic wave of the oscillator T, that is, the unknown coordinates of the point P to be measured is determined as ($x$, $y$, $z$). The period of time required for the supersonic wave oscillated from the said point P to be received at the receiving points a, b and c is measured electrically by the distance measuring device 1, including the known time difference measuring device, utilizing a computer etc., and this period of time required to reach the receiver is converted to distance.

Consequently the three dimensional coordinates $(x, y, z)$ of the point P to be measured are computed by a coordinate output device 2 utilizing a computer etc. utilizing the data of the distance values and the known coordinates $(x1, y1, z1)$, $(x2, y2, z2)$ and $(x3, y3, z3)$ of the three receiving points $a$, $b$ and $c$.

Furthermore, the configuration of the previous embodiment, that is, that the three points $a$, $b$, $c$ of known coordinates act as receiving points of the supersonic wave and that the point P to be measured is the oscillating point of the supersonic wave may be changed such that the receiving points and the oscillating point are reversed, that is, the three points $a$, $b$, $c$ function as the oscillating points of the supersonic wave, whereas the point P to be measured functions as the receiving point of the supersonic wave. In this case, similarly to the above embodiment, the three dimensional coordinates of the point P may be determined therefrom.

Furthermore, it is also possible to use more than four receiving points for the supersonic wave and three of them connectable to the oscillating point $t$ with the straight line may be selected so as to be used.

Thus, according to this embodiment of the present invention, three known coordinates are optionally selected, and the three dimensional coordinates of the point location, or article to be measured is determined. Thus, the three dimensional coordinates of any article large of small and having a complicated structure may be quickly and accurately measured.

Figure 4:
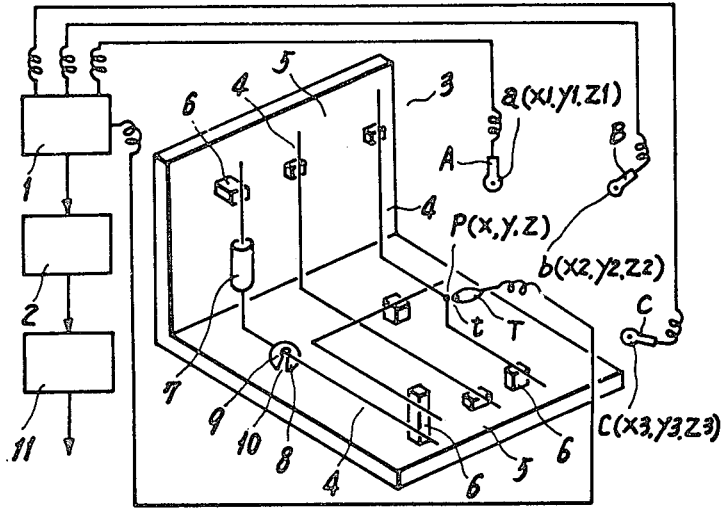
FIG. 4 is a schematic perspective view of another embodiment of the measuring device of the present invention.

Using the device of the present invention, and particularly with reference to FIG. 4, another embodiment for measuring three dimensional coordinates of respective points of models will now be described.

In a model for the design of a marine engine room and landbase plant, a model of the respective piping is constructed simply with thin core wires 4, made of either metal or non-metallic materials, and supported just at the center line position of the piping by means of supports 6 of actual or provisional construction provided on the peripheral structures 5 of the model 3.

In such models where the pipes are constructed simply with core wires, it is advantageous if partial full scale pipe models 7, flange models 8, and the other necessary model elements, such as valves, fittings, etc., are mounted on the piping core wires 4 in order to be able to examine the compatibility of said piping, flanges, valves, etc. with respect to the peripheral space which they occupy. Thus, for example, flange models 8 are designed by their center hole 9 such that they are readily mounted on the piping's core wires 4 by passing the wire through the lead groove 10 from the periphery thereof.

Figure 1:
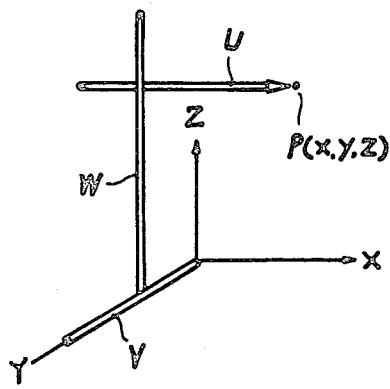
FIG. 1 is a schematic perspective view of one example of a conventional device for measuring three dimensional coordinates.
Figure 3:
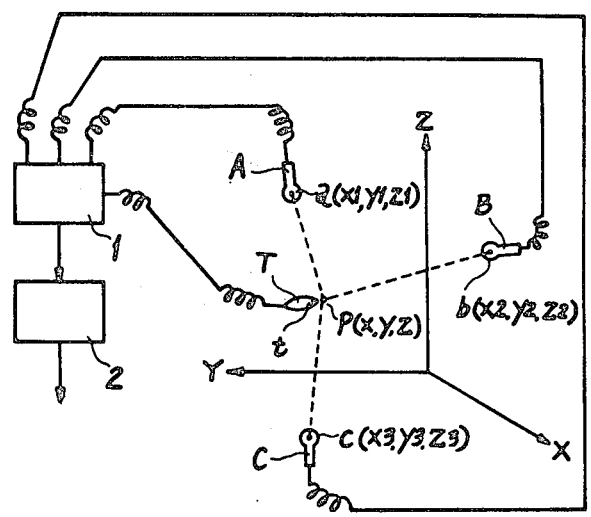
FIG. 3 is a schematic perspective view of one embodiment of the device for measuring three dimensional coordinates of models according to the present invention.
Figure 2:
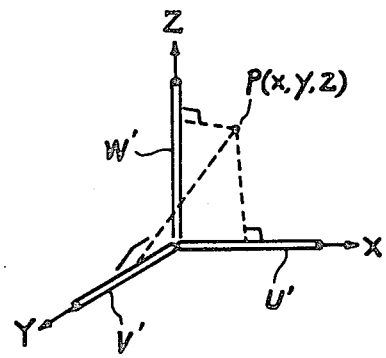
FIG. 2 is a schematic perspective view of another example of such a conventional device.

Then, similar to the embodiment shown in FIG. 3, at least three supersonic wave receivers A, B and C are optionally disposed in the measured space of the X-axis, the Y-axis, and the Z-axis including the model 3, with the oscillator T os supersonic wave being placed at the point P of the core wire 4 to be measured. Then, the supersonic wave oscillated from the oscillating point $t$ of the oscillator T is received at the respective receiving points $a$, $b$, $c$ of the respective receivers A, B, C, and three dimensional coordinates $(x, y, z)$ of the point P is obtained from the coordinate output device 2 and the distance measuring device 1.

Then, this data is treated by the actual sizing output device 11 utilizing computers, etc., and the actual size of the pipe is provided for the information of the pipe manufacture. All three dimensional coordinate data are memorized in the actual sizing output device 11 so that the actual size can be obtained.

As to flanges, valves, etc. located in the model, these elements can be omitted by imparting information to said device, at the time of measurement, that said flanges and valves are located at the corresponding positions of the core wire 4.

Thus, according to the previously discussed embodiments, by using the core wire in the reduced scale models of the pipe structure and by disposing the core wire at the center line position of the pipe, the models can be quickly and easily made when compared with the conventional full scale pipe models. It is readily apparent that the manufacturing cost of the models will be less expensive then that of the full scale models. Furthermore, by oscillating and receiving the supersonic waves between the desired point of the core wire and the proper points in the measuring space, the three dimensional coordinates of the respective points of the core wire 4 can be measured and by providing the actual sizing output device 11, the actual size of the pipe may be obtained, accurately and quickly.

Figure 5:
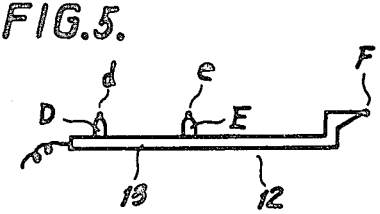
FIG. 5 is a side view of one embodiment of the supersonic oscillator used for the situation where there is an obstacle in the path of the measurement made by the device of the present invention.

According to the device of the present invention, still another embodiment thereof is shown in FIG. 5 where the oscillator is used in the situation where there is an obstacle disposed in the measured space. This oscillator 12 is constructed as follows: Two oscillators D and E are provided on a rod 13 at a predetermined distance, and a contacting point F is disposed at the end of the rod 13. The rod 13 is hooked (branched) in order that the contacting point F is situated on the extension of a line joining the two oscillating points d and e and at a predetermined distance from the point $e$. Therefore, by measuring the three dimensional coordinates of the oscillating points d and e, the three dimensional coordinates of the contacting point F can be obtained. Furthermore, such an oscillator as 12 makes the measurement of three dimensional coordinates more accurate than the case of the ordinary type oscillator, since the contacting point F placed in contact with the point P to be measured forms a very sharp point, whereas, in the ordinary type oscillator T, the contacting point $t$, that is the oscillating point, is comparatively obtuse. In addition, since there is provided contacting point F on the extended line of the two oscillating points $d$ and $e$, the three dimensional coordinates of the contacting points F is readily obtained.

Figure 6:
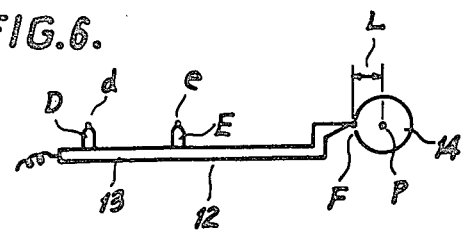
FIG. 6 is an explanatory view of the situation where the distance is corrected by the oscillator shown in FIG. 5.

As shown in FIG. 6, in case the article to be measured 14 is cylindrical or spherical, and that its central position which is to be measured is the point P, the three dimensional coordinates of the point P, that is the desired central position of the article 14 to be measured, can be easily obtained by correcting the distance from the oscillating point $e$ to the contacting point F by the length of the radius L of the article 14. More particularly, compensation for the distance between the contacting point F and the point P to be measured is very easy, since the contacting point F is situated on the extension of a line joining the two oscillating points $d$ and $e$.

Figure 7:
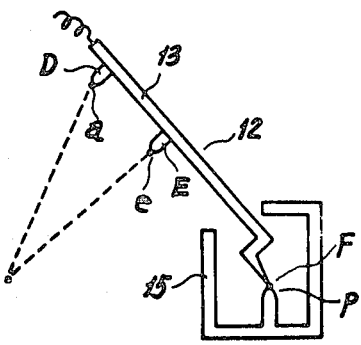
FIG. 7 is an explanatory view of the situation where the various elements of hte model are measured by the oscillator shown in FIG. 5.

As further shown in FIG. 7, even when there is an obstacle in the way of the supersonic waves between the point P to be measured and any receiving point such as point a, having known coordinates, the measurement of the coordinates for the point P becomes possible because it is in contact with point F, with the oscillating points $d$ and $e$ of the oscillator 12 being disposed at a position where the supersonic waves oscillating from the points d and e reach to the receiving point a without being obstructed by the obstacle 15.

It is also possible to alternate the shape of the rod 13 of the oscillator 12 to, for example, a bent shape or some other shape without being limited only to the shape shown in the drawings.

The invention being thus described, it will be obvious that the same may be varied in many ways. Such variations are not to be regarded as a departure from the spirit and scope of the invention, and all such modifications are intended to be included within the scope of the following claims.

We claim:

1. A system for measuring the three dimensional coordinates of an object disposed in an area which comprises an oscillating means disposed at or in the vicinity of the object whose dimensional coordinates are to be determined, said oscillating means being adapted to produce supersonic waves, at least three receiving means disposed at at least three positions having known coordinates, means for measuring, electrically, the time required for the supersonic waves to travel.from the oscillating means to the receiving means, means for converting the travel time of the supersonic waves to distant measurements and means for producing the three dimensional coordinates of said object from said known coordinate of said three positions and said converted values of distance, said oscillating means comprising a rod provided at one end thereof with a contact point for contacting the object whose coordinates are desired and said rod further containing oscillating elements at the other end thereof, said oscillating elements being unobstructed from the receiving means.

2. The system of claim 1, wherein the means for producing the three dimensional coordinates of said object includes a coordinate output device in cooperation with computer means.

3. The system of claim 1, wherein the oscillating means and receiving means are reversed such that a receiving means is disposed at or near the object whose coordinates are to be determined and at least three oscillating means are disposed at at least three positions having known coordinates.

4. The system of claim 1, wherein a plurality of oscillating means and a plurality of receiving means are utilized.

5. The system of claim 3, wherein a plurality of oscillating means and a plurality of receiving means are utilized.

6. A system for measuring the three dimensional coordinates of an object disposed in an area which comprises an oscillating means disposed at or in the vicinity of the object whose dimensional coordinates are to be determined, said oscillating means being adapted to produce supersonic waves, at least three receiving means disposed at at least three positions having known coordinates, means for measuring, electrically, the time required for the supersonic waves to travel from the oscillating means to the receiving means, means for converting the travel time of the supersonic waves to distant measurements and means for producing the three dimensional coordinates of said object from said known coordinates to said three positions and said converted values of distance, said oscillating means comprising a rod provided at one end thereof with a contact point for contacting the object whose coordinates are desired and said rod further containing oscillating elements at the other end thereof, said oscillating elements being unobstructed from the receiving means and disposed on the rod in a straight line with the contact point, said oscillating means integrating said elements and said contact point on a straight line at predetermined intervals.

7. A system for measuring the three dimensional coordinates of an object disposed in an area which comprises an oscillating means disposed at or in the vicinity of the object whose dimensional coordinates are to be determined, said oscillating means being adapted to produce supersonic waves, at least three receiving means disposed at at least three positions having known coordinates, means for measuring, electrically, the time required for the supersonic waves to travel from the oscillating means to the receiving means, means for converting the travel time of the supersonic waves to distant measurements and means for producing the three dimensional coordinates of said object from said known coordinates of said three positions and said converted values of distance, said oscillating means comprising a rod provided at one end thereof with a contact point for contacting the object whose coordinates are desired and said rod further containing two oscillating elements at the other end thereof, said oscillating elements being unobstructed from the receiving means and disposed on the rod in a straight line with the contact point, said oscillating means integrating said elements and said contact point on a straight line at predetermined intervals.

8. A system for measuring the three dimensional coordinates of models of diminutive size disposed in an area which comprises an oscillating means disposed at or in the vicinity of the model whose dimensional coordinates are to be determined, said oscillating means being adapted to produce supersonic waves, at least three receiving means disposed at at least three positions having known coordinates, means for measuring, electrically, the time required for the supersonic waves to travel from the oscillating means to the receiving means, means for converting the travel time of the supersonic waves to distant measurements and means for producing the three dimensional coordinates of said model from said known coordinates of said three positions and said converted values of distance, said oscillating means comprising a rod provided at one end thereof with a contact point for contacting the model whose coordinates are desired, said rod further containing oscillating elements at the other end thereof, said oscillating elements being unobstructed from the receiving means, and means provided for utilizing the obtained dimensional coordinates of the models for determining the actual size of the objects which said models represent.

* * * * *